Aug. 10, 1948.　　　　　G. THODOS　　　　　2,446,728
FURFURAL PURIFICATION
Filed Jan. 12, 1945　　　　　　　　　　　　　　　4 Sheets-Sheet 1

INVENTOR
GEORGE THODOS
BY Hudson & Young
ATTORNEYS

Aug. 10, 1948.  G. THODOS  2,446,728
FURFURAL PURIFICATION
Filed Jan. 12, 1945  4 Sheets-Sheet 2

INVENTOR
GEORGE THODOS
BY
ATTORNEYS

Aug. 10, 1948.                G. THODOS                2,446,728
                         FURFURAL PURIFICATION
Filed Jan. 12, 1945                                4 Sheets-Sheet 3

INVENTOR
GEORGE THODOS
BY *Hudson & Young*
ATTORNEYS

Patented Aug. 10, 1948

2,446,728

UNITED STATES PATENT OFFICE 2,446,728

FURFURAL PURIFICATION

George Thodos, Evanston, Ill., assignor to Phillips Petroleum Company, a corporation of Delaware Application January 12, 1945, Serial No. 572,532

10 Claims. (Cl. 260—347)

1

This invention relates to purification of furfural, especially furfural which has been employed as a solvent in the extractive distillation of unsaturated aliphatic hydrocarbons such as olefins or diolefins to recover such hydrocarbons from streams containing the same, and thereby contaminated with foam producing materials and "polymer." For example, furfural is commonly used as the solvent in the recovery by extractive distillation of butadiene and/or butylenes from mixed $C_4$ hydrocarbon streams containing the same. Thus in the commercial production of butadiene from normal butane by two-stage catalytic dehydrogenation it has become common to employ a furfural extractive distillation step for recovering normal butene from the first stage effluent (in actual practice the most satisfactory procedure has been found to involve first fractionally distilling the $C_4$ hydrocarbon content of the first stage effluent in a butene-1 column taking butene-1 and butadiene overhead from the normal butane and butene-2 and to then subject the latter to extractive distillation with furfural to extract the butene-2 which is then combined with the butene-1 from the overhead of the butene-1 column to give the normal butene feed to the second stage) and a second furfural extractive distillation unit for the recovery of butadiene and butene-2 from the $C_4$ hydrocarbon content of the second stage effluent, the butadiene-butene-2 mixture so recovered being fed to a fractional distillation column for separation of pure butadiene. A process of the foregoing type is described in detail in the copending application of K. H. Hachmuth, Ser. No. 481,305, filed March 31, 1943, now Patent 2,386,310, granted October 9, 1945. The application of K. H. Hachmuth, Ser. No. 438,844, filed April 13, 1942, now Patent 2,434,796, granted January 20, 1948, is directed to extractive distillation with furfural wherein a small proportion of water is dissolved in the furfural. In furfural extraction of the foregoing type the furfural becomes contaminated with foaming agents and with polymer. The present invention relates to a method of removing both of these contaminants.

The foam producing contaminants are hydrocarbons of higher molecular weight than $C_4$'s entering with the feed stream to the extractive

2 distillation unit, polymerization products such as butadiene cyclic dimer, etc., and lubricating oils entering the system from pump and valve lubricating devices. Those boiling in the same range as furfural are not readily removable by the usual steam distillation methods used for furfural purification such as are shown in U. S. patents to Buell et al. 2,350,584 and to Hachmuth 2,350,609, and in the application of Hachmuth, Ser. No. 460,874, filed October 5, 1942, now Patent 2,372,668, granted April 3, 1945. A method for the removal of such contaminants is disclosed in the copending application of Thodos et al., Ser. No. 546,371, filed July 24, 1944, now Patent 2,414,402, granted January 14, 1947, which shows that hydrocarbon contaminants which cause foaming can be removed by selective solvent extraction of the furfural with an aliphatic hydrocarbon such as normal pentane, isopentane, etc. The primary requirement is that the hydrocarbon extraction agent be used in excess of its solubility in furfural so that two distinct liquid phases will result at the operating temperatures and that the volatility of the hydrocarbon extraction agent be sufficiently different from furfural to permit ready separation by the usual distillation methods. Usually it will be desirable that the hydrocarbon extraction agent be more volatile than furfural.

In addition to becoming contaminated with hydrocarbons which cause foaming, furfural gradually polymerizes to give a heavy polymer. The rate of formation of this polymer increases as its concentration in the furfural increases. It tends to collect on heat exchange surfaces and thus impair heat transfer. Consequently, for this and other reasons, it is desirable to keep polymer at a low concentration. The usual methods for effecting polymer removal from furfural are by fractionation, steam distillation, and vacuum distillation. Of these methods of polymer removal steam distillation is probably the most common. These previously used methods are subject to various disadvantages among which are the high consumption of heat and steam, the high temperatures involved, the expensive equipment required, the corrosive nature of the materials and the loss of furfural due to additional polymerization during the re-running operation.

The principal object of the present invention is to provide an improved process for the removal of polymer from furfural. Another object is to provide a process for accomplishing both the removal of furfural polymer and hydrocarbons which cause foaming in the same operation. Another object is to effect the removal of furfural polymer at low temperature and under conditions which minimize further polymer formation. Another object is to accomplish the foregoing purposes and aims in a simple and economical manner. Numerous other objects will hereinafter appear.

*Removal of polymer*

The present invention provides a new and improved method of effecting the removal of furfural polymers from furfural, either dry or containing small percentages of water. I have found that certain hydrocarbons, particularly the aliphatic hydrocarbons, especially the paraffins, having from three to eight carbon atoms per molecule, are effective solvents for furfural but not for furfural polymers and that by using a sufficient amount of any one or a mixture of these hydrocarbons the furfural can be completely dissolved to the substantial exclusion of the polymers present. However, in commercial operations for removal of furfural polymers from furfural it is usually desirable to retain a certain amount of furfural in the polymer to maintain fluidity in order to permit ready removal from processing equipment. Under such circumstances it is preferred to employ enough of the hydrocarbon extraction solvent to dissolve 90 to 99% of the furfural and precipitate or cause to be undissolved a phase consisting essentially of substantially all of the polymer in admixture with, or in solution with, the 1 to 10% of undissolved furfural. Polymer and furfural are completely miscible with one another in all proportions. The polymer phase and the extract phase are allowed to separate from one another as by settling and are separately withdrawn. The polymer phase is usually discarded. The extract phase may be fractionally distilled to recover the purified furfural which is essentially polymer-free and the hydrocarbon extractant.

In its broad aspect the present invention resides in a method of removing polymer from furfural which comprises intimately contacting the contaminated furfural in liquid phase with a hydrocarbon which may be in either liquid or vapor phase and separately withdrawing a phase of polymer and a phase of the hydrocarbon and furfural. If the hydrocarbon is employed in vapor phase the hydrocarbon-furfural phase will usually be in vapor phase also although if conditions are such that condensation occurs it may be in liquid phase or in liquid and vapor phases. If the hydrocarbon is in liquid phase the contacting effects a liquid-liquid extraction.

In carrying out the extraction, conventional means for obtaining intimate contact, such as centrifugal mixing pumps, packed columns, orifice contactors and the like associated with the usual means for settling or effecting layer separation may be employed.

As the solvent, I may use any aliphatic paraffin ranging from propane to octanes or any aliphatic olefin ranging from propylene to octenes. In extreme cases, aliphatic conjugated diolefins such as butadiene may be used. Instead of aliphatic (acyclic) hydrocarbons I may, though less preferably, employ certain naphthene hydrocarbons such as cyclohexane, methyl cyclopentane, cyclopentane, etc. I prefer to use a hydrocarbon such as normal butane which will be eliminated overhead in the extractive distillation in which the furfural is employed.

The temperature at which the extraction is conducted should be sufficiently high that furfural and hydrocarbon are completely miscible with each other and the mixture is adequately mobile and that a minimum of hydrocarbon solvent is required to dissolve the required amount of furfural, but should be sufficiently low to effect precipitation of substantially all of the polymer. In general, the lower the temperature the less soluble is the polymer in the furfural-hydrocarbon phase. Higher temperatures increase the solubility of the furfural in the hydrocarbon thus reducing the amount of solvent required but at the same time increasing the solubility of polymer in the furfural-hydrocarbon solution. Therefore a compromise based upon these two opposing factors must be adopted. The smaller amount of hydrocarbon required to dissolve the furfural at higher temperatures effects a smaller hydrocarbon-furfural volume which dissolves less polymer than a larger volume would and this factor tends to offset the disadvantage of higher polymer solubility with increasing temperatures. Usually the extraction will be conducted at from 150 to 250 degrees F.

The amount of furfural left in the polymer phase should be such as to give it sufficient fluidity to enable it to be readily removed at the temperature maintained in the settling zone. It may range from 10% to 50% by weight of the polymer phase. It is preferred to keep the amount of furfural so employed at a minimum since it represents a loss of furfural.

The aliphatic unsaturated hydrocarbons, particularly the monoolefins, may be used as a solvent for polymer removal; however, there is a tendency for furfural polymer to be more soluble in unsaturated than in saturated hydrocarbons which somewhat reduces the effectiveness of separation. On the other hand, this disadvantage is in large part offset by the fact that furfural is considerably more soluble in an olefin than in a saturated hydrocarbon solvent. Thus, for a given temperature the amount of olefin solvent required to effect polymer removal is appreciably less than with a saturated hydrocarbon. This permits using smaller equipment than with saturated aliphatic hydrocarbon solvents for a given set of operating conditions, or about the same size equipment as required for a saturated hydrocarbon solvent might be used at lower operating temperatures and pressures. If an unsaturated hydrocarbon were used instead of normal butane as described above, it would normally be desirable that it be readily eliminated with the overhead products of the extractive distillation unit the same as normal butane. Normal butylene would be eliminated in this manner. If butadiene were used, the furfural from the polymer removal step should be subjected to the stripping step of the butadiene solvent recover unit before it enters the extractive distillation unit. Feeding furfural containing butadiene to the extractive distillation unit will reduce the amount of butadiene that could otherwise be dissolved in a given amount of furfural thereby decreasing the effectiveness of the unit for performing its intended function.

Other solvents may be used in the removal of polymer from furfural in accordance with my invention. For example, certain of the naphthenes may be used such as, for example, cyclohexane, methyl cyclopentane, etc. However, these are not nearly as effective as the olefinic and saturated aliphatic hydrocarbons because of the relatively high solubility of the polymer in the naphthenes. Consequently, they would not normally be used.

Aliphatic hydrocarbons heavier than $C_3$ to $C_8$ can be used in this invention. However, they are less preferable than the $C_3$ to $C_8$ range hydrocarbons for the following reasons: (1) Those hydrocarbons boiling near furfural and dissolved therein are difficult, if not impossible, to separate from furfural by ordinary fractionation or steam distillation, consequently special means must be employed to effect their removal; (2) use of hydrocarbons having sufficiently higher boiling temperature than furfural that separation of any such hydrocarbon dissolved in furfural can be effected by ordinary fractionation, necessitates that the furfural be subjected to its boiling point temperature under the conditions of temperature and pressure employed in the fractionation system which pressure is usually atmospheric or higher, under such conditions the boiling point of furfural is sufficiently high to promote polymer formation; (3) heavy hydrocarbons, if retained in the furfural in relatively low concentrations, generally result in the furfural foaming when used in extractive distillation and stripping steps of a hydrocarbon recovery process, thus greatly reducing the effectiveness of such steps for performing their intended functions.

As pointed out earlier, the principle of this invention may be applied to either dry furfural or furfural containing small percentages of water. There is a tendency, however, for the water to separate as a separate phase when furfural containing water is dissolved in hydrocarbon. Usually the amount of water that has to be present in the furfural before this becomes apparent, is between 3 to 4 weight per cent. Any liquid water separating during this treatment is eliminated from the system with the polymer separated from the furfural. The major portion or substantially all of the water remaining in the furfural passes overhead with the hydrocarbon in the fractionation step depending on the amount of hydrocarbon and water dissolved in the furfural and fractionator operation for separating the dissolved hydrocarbon from the furfural. When the overhead product of the fractionation step is condensed the water will form a separate liquid phase in the overhead accumulator. This water phase may be withdrawn and discarded (means not shown in drawings), returned to the fractionator with the hydrocarbon reflux to eventually appear in the furfural bottom product, or be returned to the fractionator at some other point such as near the bottom or with the feed (means not shown in drawings). If the water phase from the fractionator overhead accumulator is withdrawn and discarded, substantially dry furfural will usually be obtained as a bottom product from the fractionator. Usually it will be desirable to retain small percentages of water in the furfural bottom product from the fractionation step to permit operating at lower reboiler temperatures than would otherwise be required, thus decreasing the tendency for polymer formation due to elevated temperatures. As pointed out earlier, if the furfural is to be used in connection with a hydrocarbon recovery process, it is generally desirable to have small percentages of water present. Generally in such processes it is desirable to maintain about 4-6 weight per cent water in the furfural. Consequently, because of the loss of small amounts of water in the furfural polymer and in the hydrocarbon withdrawn from the fractionator as overhead product which will be saturated under the conditions prevailing in the overhead product accumulator, it will be necessary to provide means (not shown in drawings) for adding water to keep the concentration at the desired level.

In general the process of polymer removal in accordance with the present invention involves intimately commingling the hydrocarbon solvent and the polymer-contaminated furfural in liquid-liquid extraction relationship using proportions and conditions such that substantially all of the polymer goes into one phase while the major proportion of the furfural forms a second phase with the hydrocarbon, effecting separation of these two phases and separately withdrawing them. The furfural-hydrocarbon phase is essentially free from polymer and in most cases is treated in such manner as to effect a substantial degree of separation of hydrocarbon from furfural. For example, it may be cooled below the temperature of complete miscibility and subject to layer formation, the furfural layer being the purified product, and the hydrocarbon layer being recycled to the extraction unit. Or the furfural-hydrocarbon phase may be fractionally distilled, the hydrocarbon overhead being recycled to the extraction system and the bottoms product being composed of polymer-free furfural.

In some cases it may be desirable to extract the polymer phase (raffinate from the extraction) a second time with hydrocarbon, the extract resulting from the second extraction being combined with the extract from the first extraction and the combined extracts being treated to recover hydrocarbon from furfural as just described. In other cases the contacting between the hydrocarbon solvent and polymer-contaminated furfural may be carried out countercurrently and, if desired, stepwise in any number of steps, the contaminated furfural being first extracted with the extract phase from the second extraction and the polymer phase obtained in the first extraction being given a second extraction with fresh hydrocarbon (usually mainly recycled hydrocarbon obtained by separation of hydrocarbon from the first extract phase). Any number of steps or extractions may be provided, the polymer phase from each extraction being passed to the succeeding extraction for further treatment, and each extraction except the last being carried out with hydrocarbon phase from a succeeding extraction, the final extraction being carried out with fresh hydrocarbon.

The relative proportions of polymer-contaminated furfural and hydrocarbon extractant used in the extraction may vary within wide limits depending upon the concentration of polymer in the furfural, the temperature of extraction, the particular hydrocarbon extractant employed (i. e. whether it is a paraffin, olefin, diolefin, naphthene, and how many carbon atoms per molecule it contains), how much furfural is to be left in the polymer to plasticize same, and possibly upon other factors. However, those skilled in the art will be readily able to determine the proper proportions for any particular situation, in the light of the present disclosure. In general it may be stated that the weight ratio of solvent to polymer-contaminated furfural will vary from about 1 to 1 to about 10 to 1.

Removal of both polymer and foaming oils

In a more specific embodiment of the present invention, both polymer and hydrocarbons which cause foaming are removed from the contaminated furfural in the same operation.

Like the embodiment described above the present embodiment takes advantage of the discovery that furfural polymer is substantially insoluble in aliphatic hydrocarbons, especially the saturated hydrocarbons, and relatively insoluble in certain of the naphthenic hydrocarbons such as cyclohexane and methyl cyclopentane. In the present embodiment the furfural contaminated with polymer and hydrocarbons of the type previously mentioned, which cause foaming in distillation and stripping steps, is treated with a sufficiently large volume of the hydrocarbon extraction agent to dissolve substantially all of the furfural. Under such conditions the polymer, which is substantially insoluble in the extraction agent, forms a separate phase which is readily removable, while the foaming hydrocarbons go into the furfural-extractant phase. The two phases are separated and separately withdrawn as before. By subsequently cooling the furfural-hydrocarbon mixture, the solubility of each in the other can be reduced to the extent that two liquid phases will form, one rich in furfural containing some of the hydrocarbon solvent and the other rich in the hydrocarbon solvent and containing small percentages of furfural and substantially all of the foam producing agents. The furfural-rich phase is substantially free of foam-producing oils and may be used in subsequent hydrocarbon recovery processes without further treatment, or if desired, may be treated for removal of the small amounts of hydrocarbon dissolved therein. Usually, it is desirable to remove the dissolved hydrocarbon, as by a fractional distillation. The hydrocarbon-rich phase containing small amounts of furfural and the foam-producing agents may be subjected to treatment for the recovery of the hydrocarbon extraction agent for recycling to the extraction unit. This may be done by fractionally distilling the hydrocarbon-rich phase to obtain the hydrocarbon as the overhead product and the dissolved furfural and foam-producing oils as the bottom product. The bottom product, if so desired, may be further treated for furfural recovery.

Some of the more satisfactory hydrocarbons for the removal of polymer and foam-producing oils from furfural are isopentane, n-pentane, n-hexane and related compounds. Others, both heavier and lighter, can be used. In general, the same hydrocarbons as are disclosed above for the removal of polymer alone may be employed, and the same statements made above in connection with the removal of polymer alone are applicable, with obvious modification as necessary, to the removal of both polymer and foam-producing oils. In particular, the statements concerning conditions of the extraction, relative proportions of extractant and contaminated furfural and temperature of extraction apply equally in both cases. In this modification, as before, multiple extraction steps and the like may, of course, be employed.

Modified method

Another modification of the invention consists of effecting the separation of furfural polymer from furfural by stripping the polymer-contaminated (or polymer- and foaming oil-contaminated) furfural with superheated vapors of a light aliphatic hydrocarbon, for example, a paraffin or aliphatic olefin having from three to eight and preferably not over six carbon atoms per molecule and removing as an overhead product the stripping agent and furfural and foam-producing hydrocarbons, if present, the polymer being left behind and preferably withdrawn in admixture with sufficient furfural to render it adequately fluid at the operating temperature. Hydrocarbons suitable for this purpose will be of the same type as those enumerated for the embodiments described above. The stripping may be carried out in a column which may be packed or provided with the usual means such as bubble plates for obtaining the desired intimacy of contact between vapor and liquid. The overhead product from the stripping step is condensed. Two liquid phases separate, an upper layer rich in hydrocarbon and a lower layer rich in furfural. By reason of their greater solubility in the hydrocarbon extraction agent the foam-producing contaminants, if present in the contaminated furfural being treated, will concentrate in the upper or hydrocarbon phase. These two phases are then separated and further treated in the manner set forth above under the heading "Removal of both polymer and foaming oils." In these modifications, multiple stripping steps may, of course, be employed.

General

The process of the present invention applies equally well to dry furfural or furfural containing small percentages of water.

Figure 1:
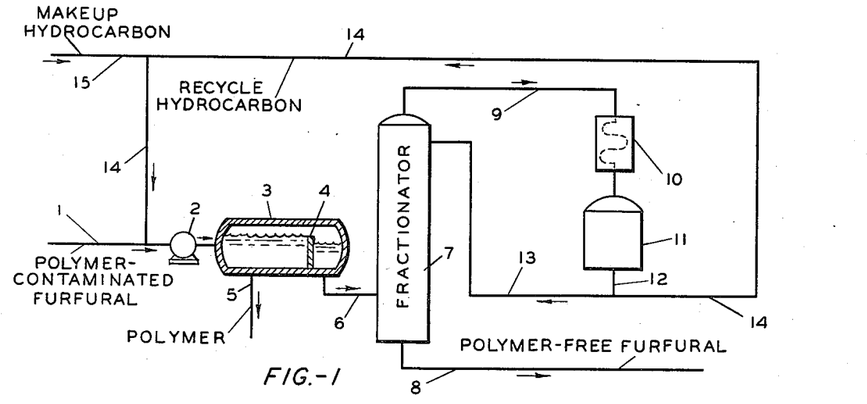
Figs. 1 to 6 show diagrammatically several arrangements of equipment which may be employed for carrying out the removal of polymer from furfural contaminated therewith in accordance with the present invention.

Referring now to the accompanying drawings:

In Fig. 1, furfural contaminated with polymer along with hydrocarbon from branch line 14 is introduced into settler 3 by means of line 1 and mixing pump 2. In mixing pump 2 the hydrocarbon, in an amount sufficient to dissolve substantially all of the furfural, and the furfural are thoroughly mixed. In settler 3 the polymer separates from the hydrocarbon-furfural mixture and settles to the bottom of settler 3 without passing over baffle 4 located near the middle or opposite end of the settler from that into which the hydrocarbon-furfural-polymer mixture is introduced. The polymer is withdrawn through line 5. The amount of hydrocarbon solvent used is so regulated that the polymer withdrawn via line 5 will contain sufficient furfural to maintain it in a fluid condition at the operating temperatures. The furfural-hydrocarbon solution accumulates on the same side of the baffle 4 in settler 3 as the polymer and above the polymer phase until it flows over baffle or dam 4. The hydrocarbon-furfural solution is withdrawn from settler 3 via line 6 into fractionator 7. In fractionator 7 the hydrocarbon is separated from the dissolved furfural. The furfural is removed as a bottom product through line 8 to be stored, further processed, or returned to a hydrocarbon recovery process (not shown) such as butene and/or butadiene extractive distillation. The hydrocarbon is removed as the overhead product from fractionator 7 through line 9 and condenser 10 into accumulator 11. The hydrocarbon from accumulator 11 is withdrawn through line 12. A portion is returned to column 7 through line 13 as reflux. The remaining portion is returned to line 1 through line 14 to be mixed with the contaminated furfural as previously described. Line 15 connecting with line 14 is provided for adding hydrocarbon solvent to replace any lost through leaks, solution in products withdrawn from the system, etc.

Usually it is desirable to provide heaters (not shown) in lines 1 and 14 in order to heat the solvent and contaminated furfural. The solubility of the furfural in solvent is considerably higher at elevated temperatures than at low temperatures. Thus the amount of solvent required at the higher temperatures is considerably less than at the lower temperatures. Consequently, smaller equipment can be used for processing a given amount of furfural. Also the load on the fractionator for recovering the solvent will be greatly reduced.

Figure 2:
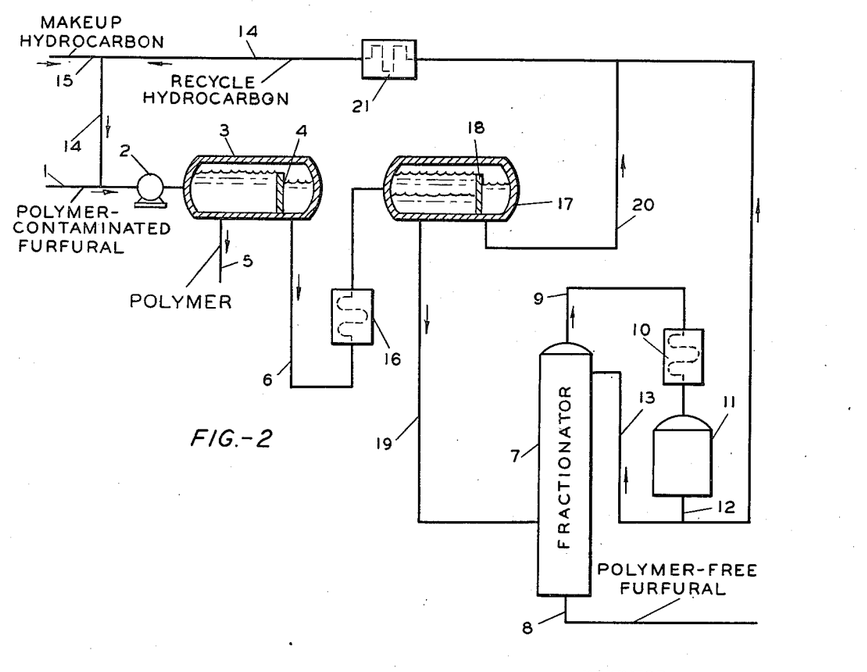

Fig. 2 portrays a modification wherein a cooler 16 and a settling tank 17 are added in line 6 of Fig. 1. By sufficiently cooling the furfural-hydrocarbon solution in line 6 with cooler 16 and introducing it into settling tank 17, two liquid phases are obtained, a hydrocarbon-rich and a furfural-rich phase. The furfural-rich phase, being heavier, stays on the side of baffle or dam 18 on which the mixture is introduced. The hydrocarbon-rich phase collects on top of the furfural-rich phase and flows over baffle 18, is removed through line 20 and is introduced into line 14. The furfural-rich phase is removed from settler 17 via line 19 and introduced to column 7 where clean furfural is recovered as the bottom product and hydrocarbon as the overhead as in Fig. 1. The overhead of column 7 and the hydrocarbon-rich phase from line 20 are recycled to line 1 to be mixed with furfural contaminated with polymer. A heater 21 in line 14 is employed to bring the hydrocarbon solvent up to the proper temperature after having been cooled by cooler 16 previously described.

The advantage of the arrangement of Fig. 2 is that the load on fractionator 7 is appreciably less than in Fig. 1.

Figure 3:
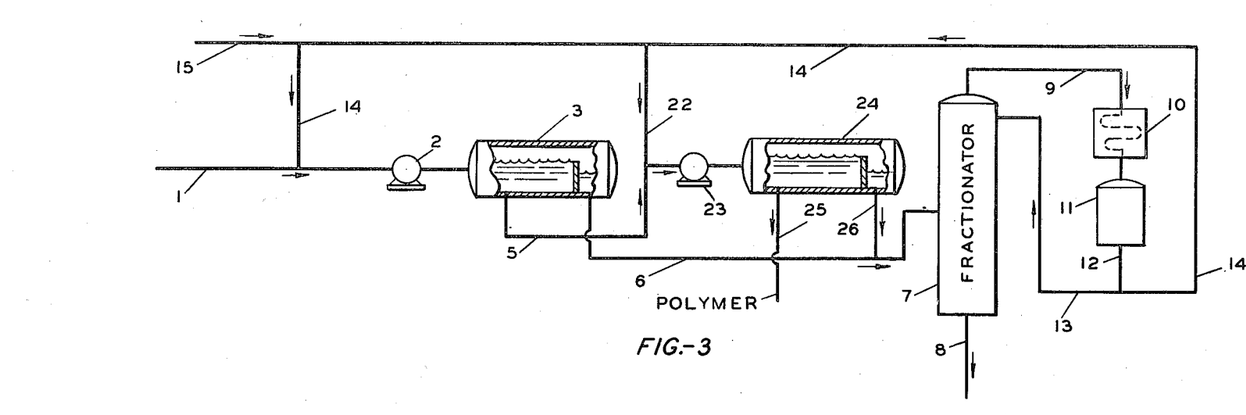

Fig. 3 portrays a modification wherein the furfural is treated with fresh solvent in two steps. The furfural-polymer-rich phase from settler 3 is fed via line 5 to a second treatment with hydrocarbon admitted via line 22. After thorough contacting in pump 23 the mixture is fed into settler 24. Polymer is withdrawn via line 25. The furfural-hydrocarbon solution is withdrawn via line 26 and combined with the furfural-hydrocarbon solution from settler 3 in line 6 and introduced into column 7. The remaining steps in the process are essentially as in Fig. 1.

Figure 4:
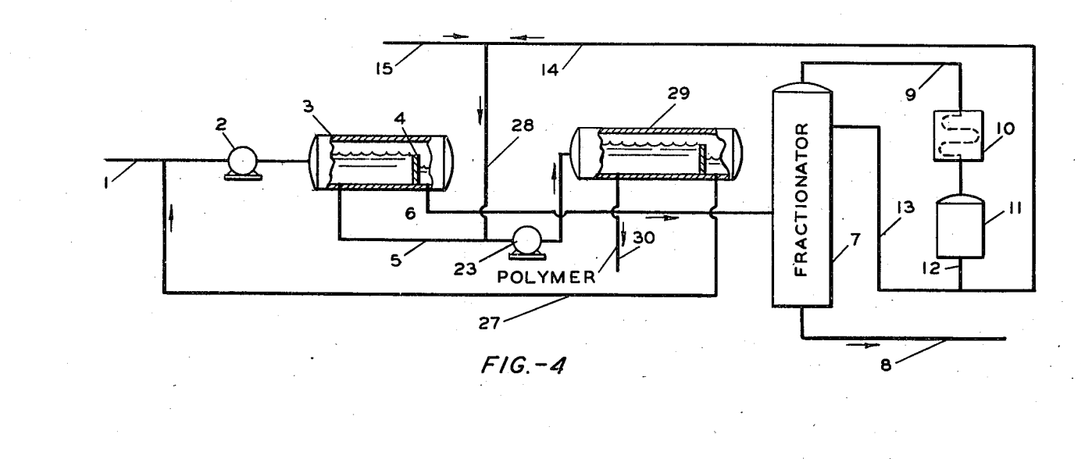

Fig. 4 portrays what is, in effect, a process for countercurrent stepwise contacting between the hydrocarbon solvent and contaminated furfural. Furfural contaminated with polymer entering via line 1 and a hydrocarbon-rich solvent from line 27 are intimately mixed in pump 2 and fed to settling tank 3. The hydrocarbon dissolves a substantial amount of furfural and upon settling in tank 3 two liquid phases are obtained, a polymer-rich phase which immediately settles to the bottom of settler 3 to the left of baffle 4, and a hydrocarbon-furfural-rich phase on top of the polymer phase which flows over baffle 4 into the compartment on the right of baffle 4. The latter phase is fed via line 6 to fractionator 7 operated as before. The overhead from column 7 is fed via lines 14 and 28 into admixture with the polymer-rich phase in line 5 on the suction side of mixing pump 23 which thoroughly mixes them and discharges into a settler 29 which functions similarly to settler 3. The polymer-rich phase in this settler has substantially all of the furfural removed except for that necessary to maintain fluidity of the polymer at the operating temperatures to permit its removal from the system. It is withdrawn through line 30. The hydrocarbon-rich phase is withdrawn through line 27 to be introduced into line 1 for mixing with polymer contaminated furfural feed as previously described.

Figure 5:
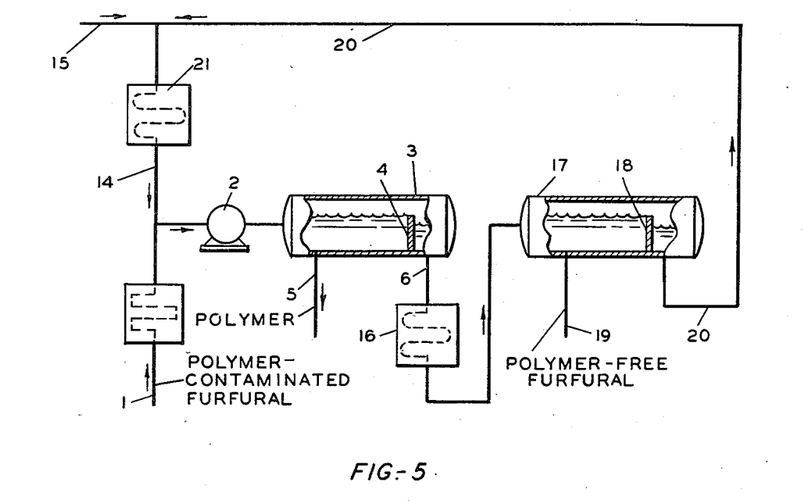

Fig. 5 portrays a modification which is the same as that of Fig. 2 except that the fractionator 7 is omitted and replaced by cooling and layer separation equipment. This modification is applicable wherein it is unnecessary to remove the hydrocarbon solvent remaining in the furfural. For example, the furfural to be treated for polymer removal may be that used in the extractive distillation and stripping steps of butadiene recovery process such as it is disclosed in K. H. Hachmuth's copending application, Ser. No. 454,312, filed August 10, 1942, now Patent 2,415,006, granted January 28, 1947. In this process the butadiene is recovered from a mixed $C_4$ hydrocarbon stream consisting of normal butane, isobutane, isobutylene, normal butylenes, butadiene, etc. In the extractive distillation step the butadiene, some of the butenes-2 and any vinyl acetylene present are retained in the furfural and removed as bottom product. The other $C_4$ hydrocarbons are obtained as overhead products. Consequently, in a polymer removal process according to Fig. 5 used in conjunction with a furfural extractive distillation step followed by a stripping step for recovery of butadiene from a mixed $C_4$ hydrocarbon stream, it is desirable that the hydrocarbon solvent be one readily eliminated with the overhead products of the extractive distillation step; for example, normal butane. Furfural containing polymer is withdrawn from such a process of extractive distillation, subjected to treatment with normal butane according to the process of Fig. 5, and subsequently returned to the extractive distillation tower. In the latter tower the normal butane is removed as overhead as previously described.

In Fig. 5 the polymer-contaminated furfural enters via line 1, is admixed with hydrocarbon from line 14, mixed intimately in pump 2 and discharged into settler 3 from which the polymer phase is drawn off via line 5. The hydrocarbon-furfural phase leaves via line 6 as before, is cooled below the point of miscibility in cooler 16 and fed to settler 17 in which separation into a furfural-rich phase and a hydrocarbon-rich phase takes place. The former phase is withdrawn via line 19 and recycled to the extractive distillation system. The hydrocarbon phase is recycled via lines 20 and 14 to the incoming impure furfural feed.

Figure 6:
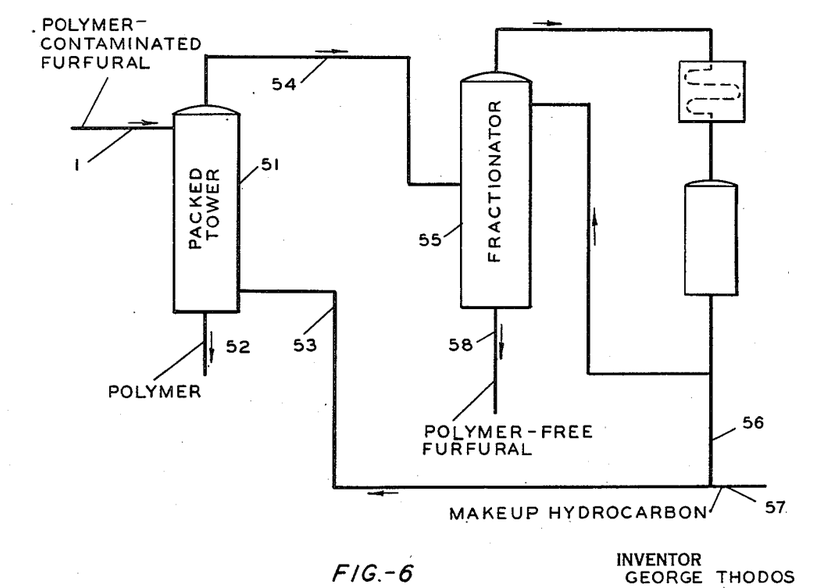

In Fig. 6 there is portrayed a modification embodying the principle of my invention wherein the furfural and solvent are countercurrently contacted in a packed tower thus eliminating the settler or settlers and their accompanying mixing pumps shown in the foregoing modifications. It is obvious that a packed tower or towers can be substituted for the mixing and accompanying settling zones of the other modifications.

In Fig. 6 the polymer-containing furfural enters packed tower 51 via line 1 and is extracted countercurrently by hydrocarbon introduced via line 53, the raffinate or polymer phase leaving via line 52. The extract passes by line 54 to column 55 operated like column 7 in the foregoing figures. The overhead hydrocarbon is recycled via lines 56 and 53, makeup hydrocarbon being introduced as necessary by line 57. The purified furfural leaves via line 58.

Figure 7:
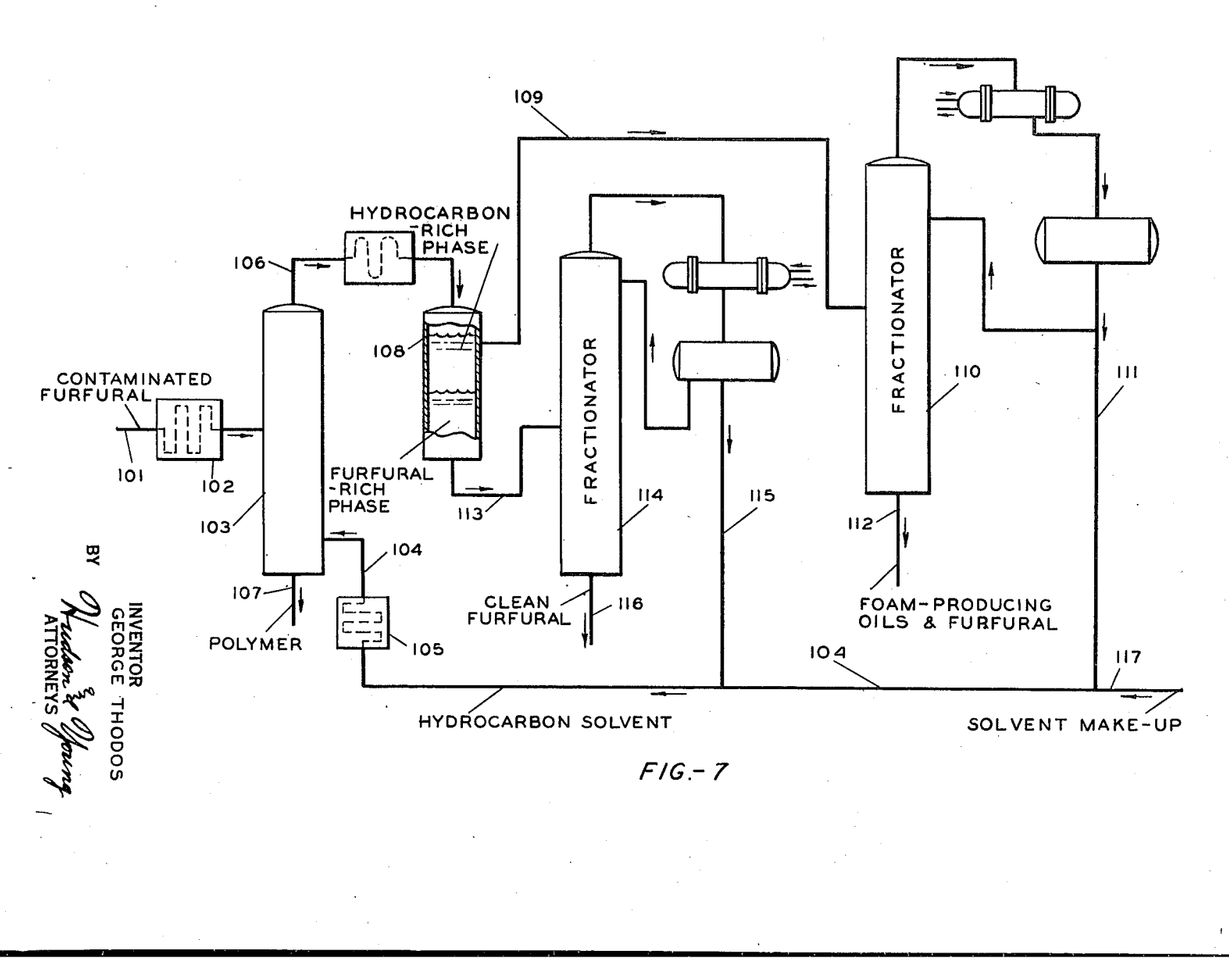
Fig. 7 shows an arrangement employed for effecting simultaneous removal of polymer and foam-producing oils from furfural contaminated therewith.

Fig. 7 portrays a modification adapted to effect removal of both polymer and foam-producing oils. In this figure the contaminated furfural enters the system via line 101 containing heater 102 which brings it to the proper extraction temperature. It is then extracted in column 103 liquid-liquid manner with hydrocarbon solvent introduced at the bottom of column 103 by means of line 104. The solvent is brought to a suitable temperature by heater 105. The polymer is removed via line 107 while the hydrocarbon extraction agent and the dissolved furfural and foaming oils leave via line 106, are cooled, and fed to settler 108 in which layer separation occurs. The upper phase, rich in hydrocarbon, is fed via line 109 to fractionation column 110 where the hydrocarbon is separated overhead via line 111 from the foaming oils and dissolved furfural which leave via line 112. The furfural phase separated in unit 108 is passed via line 113 to column 114 where it is resolved into an overhead hydrocarbon fraction leaving via line 115 and a clean furfural fraction leaving via line 116. The hydrocarbon fractions in lines 111 and 115 are recycled via line 104. Fresh solvent is added as needed by line 117.

If desired unit 103 may function as a stripper, superheated hydrocarbon vapors being injected via line 104 and removing most of the furfural and foaming oils via line 106 from the polymer which leaves via line 107. This was described above under the heading "Modified method."

Following are examples of the practice of the present invention:

*Example 1*

In a modification embodying the principle of my invention according to Figure 1, furfural from a hydrocarbon recovery process employing extractive distillation was continuously fed by means of line 1 to pump 2 and into settler 3. Normal pentane from line 14 was also continuously introduced into line 1 and thoroughly mixed with the furfural in pump 2 before being discharged into settler 3. The composition of the furfural feed was as follows:

|  | Weight per cent |
|---|---|
| Furfural | 96 |
| Polymer | 1.5 |
| Water | 2.5 |

Pentane was mixed with the polymer contaminated furfural at the approximate rate of 377 pounds per 100 pounds of furfural feed. The temperature maintained in mixing zone 2 was 210° F., by means of heaters (not shown) in lines 1 and 14, respectively, before mixing pump 2. In settler 3 the temperature was controlled by means of a cooler (not shown) in line 1 after mixing pump 2 such that the polymer product from settler 3 contained about 50 weight per cent furfural for maintaining fluidity. In this particular instance the temperature was maintained at about 200° F. Polymer was withdrawn from settler 3 through line 5 and discarded from the system. The normal pentane-furfural solution flowing over baffle 4 in settler 3 was fed by means of line 6 into fractionator 7. In fractionator 7 substantially pure pentane was obtained as overhead product and returned through line 14 to line 1 to treat more furfural contaminated with polymer as previously described. Substantially polymer free furfural containing about 2.5 weight per cent water was obtained as the bottom product. The water content of the polymer free furfural product was but little different from that of the feed since the content in the feed was sufficiently low that very little was lost in the polymer removed from the system, and the water phase appearing in the overhead accumulator 11 of fractionator 7 was totally refluxed to fractionator 7 by means not shown.

*Example 2*

In the same modification as described above in Example 1 the cooler (not shown) after pump 2 was omitted and the ratio of furfural to polymer withdrawn from settler 3 through line 5 was controlled at about 50-50 by varying the ratio of contaminated furfural to normal pentane fed through line 1 and pump 2 into settler 3. The temperature in settler 3 was maintained at about 200° F. by means of the heaters in lines 1 and 14 (not shown) before pump 2. The results were almost identical as obtained by the process and under the conditions described above.

By operating settler 3 at about 231° F. it was found that by the process of both of the above variations of Figure 1 substantially the same effectiveness of polymer removal could be obtained using considerably less normal pentane. Under these conditions for each 100 pounds of contaminated furfural about 100 pounds of normal pentane was required. Thus the load on fractionator 7 was greatly reduced by operating settler 3 under these conditions.

*Example 3*

The equipment arrangement shown in Fig. 7 of the drawing was used. Contaminated furfural of the following approximate composition was fed to extractor 103:

|  | Weight per cent |
|---|---|
| Furfural | 96 |
| Polymer | 1.5 |
| Heavy oils | 0.5 |
| Water | 2.0 |

In extractor 103 the contaminated furfural was countercurrently contacted with normal pentane. The ratio used was about 280 pounds of pentane per 100 pounds of feed. The extraction was carried out at 220° F. Under these conditions, the furfural was substantially completely dissolved except for that retained in the polymer to maintain fluidity so that it could be readily drained from the system. The polymer was substantially quantitatively separated from the main body of furfural by this treatment. The polymer was removed from the bottom of extractor 103 via line 107. The amount of polymer and furfural removed per 100 pounds of feed was about 1.5 pounds each. The hydrocarbon extraction agent with the dissolved furfural and foam producing oil contaminations were removed overhead from extractor 103, cooled to about 100° F., and introduced into settler 108 where the cooled material separated into two liquid phases. The upper phase was rich in the n-pentane extraction agent and contained small amounts of dissolved furfural and substantially all of the heavy oil contaminants originally in the furfural. The lower phase was rich in furfural and contained a small percentage of n-pentane. The approximate composition of the two phases was as follows per 100 pounds of contaminated furfural feed to extractor 103.

|  | Hydrocarbon Rich Phase | Furfural Rich Phase |
|---|---|---|
| Furfural, lbs | 17.5 | 77.0 |
| Water, lbs | Trace | 2.0 |
| Heavy Oils, lbs | 0.5 | Trace |
| Normal Pentane, lbs | 273.1 | 6.9 |
|  | 291.1 | 85.9 |

From settler 108 the furfural and normal pentane rich phases, respectively, were fed to fractionators 114 and 110 for separation of furfural from dissolved normal pentane and the separation of normal pentane from heavy oils and dissolved furfural. The normal pentane overhead product from each of these fractionators was combined and recycled to the extraction step in vessel 103. If the furfural contains small percentages of water, it is usually desirable to supply the reflux accumulator on fractionator 114 with a high level hydrocarbon withdrawal line in order that the pentane recycled will not contain any free water. The reflux line may be either a flush or a high level withdrawal line. If the reflux is a high level withdrawal line, means must be provided for removal of the water from the reflux accumulator. Usually, it will be desirable to have a flush reflux withdrawal line to permit refluxing any free water. This will prevent the loss of the small amounts of furfural that will distill overhead and selectively dissolve in the water. Also, it will give a furfural bottom product containing at least a portion of the water normally desirable for extractive distillation purposes, for example, the recovery of butadiene from a mixed $C_4$ hydrocarbon stream. Also the bottom temperature in tower 114 is substantially reduced when small percentages of water are present. Thus, thermal polymerization of the furfural is considerably reduced.

The bottom product, containing the furfural dissolved in the hydrocarbon phase and the heavy oil foam producing contaminants, from tower 110 was discarded. However, if desired, this stream may be further treated for the recovery of furfural (means not shown).

From the foregoing it will be seen that the present invention provides a simple and economical method of removing polymer or polymer and foam-producing oils from furfural contaminated therewith. The process does not require an excessive amount of equipment. Maintenance of the polymer-containing furfural at high temperatures which would tend to cause difficulties is avoided. Formation of further polymer is minimized and loss of furfural in other ways is low in the new process. If foaming oils are present in the furfural being treated for polymer removal they are also removed without excessively complicating the process. Many other advantages of the present invention will be at once apparent to those skilled in the art.

I claim:

1. The process of removing furfural polymers from furfural contaminated therewith which comprises extracting the contaminated furfural in liquid-liquid manner with from one to ten times its weight of an aliphatic hydrocarbon selected from the group consisting of paraffins and olefins having from 3 to 8 carbon atoms per molecule at a temperature in the range from 150 to 250° F., and separately withdrawn a polymer phase and a phase of hydrocarbon and furfural essentially free of polymer.

2. The process of removing furfural polymers from furfural contaminated therewith which comprises extracting the contaminated furfural in liquid-liquid manner with from one to ten times its weight of an aliphatic hydrocarbon selected from the group consisting of paraffins and olefins having from 3 to 8 carbon atoms per molecule at a temperature in the range from 150 to 250° F., and separately withdrawing a polymer phase containing sufficient furfural to maintain fluidity such that it may be readily withdrawn from the contact zone, and a phase of hydrocarbon and furfural essentially free of polymer.

3. The process of claim 2 wherein the amount of furfural left in the polymer phase ranges from 10 to 50 percent by weight of said polymer phase.

4. The process of removing furfural polymers from furfural contaminated therewith which comprises extracting the contaminated furfural in liquid-liquid manner with from one to ten times its weight of an aliphatic hydrocarbon selected from the group consisting of paraffins and olefins having from 3 to 8 carbon atoms per molecule at a temperature in the range from 150 to 250° F., and separately withdrawing a polymer phase containing sufficient furfural to maintain fluidity such that it may be readily withdrawn from the contact zone, and a phase of hydrocarbon and furfural essentially free of polymer, and treating said last named phase to effect separation of hydrocarbon from furfural and separately recovering said hydrocarbon from said furfural.

5. The process of claim 4 in which said separation of hydrocarbon from the furfural is effected by cooling said last named phase to a point below the temperature of complete miscibility thereby forming a furfural phase and a hydrocarbon phase, separating said furfural phase and said hydrocarbon phase and separately withdrawing said phases.

6. The process of claim 4 in which said separation of hydrocarbon from furfural is effected by fractionally distilling said last named phase to obtain a furfural fraction and a hydrocarbon fraction.

7. The process of removing a furfural polymer and foaming oils from furfural contaminated therewith which comprises intimately contacting the contaminated furfural with from one to ten times its weight of an aliphatic hydrocarbon selected from the group consisting of paraffins and olefins having from 3 to 8 carbon atoms per molecule at a temperature in the range from 150 to 250° F., separately withdrawing a polymer phase and a phase of hydrocarbon and furfural essentially free of polymer, cooling said last named phase below the point of complete miscibility of furfural and hydrocarbon and thereby effecting a formation of two separate phases, namely, a hydrocarbon phase containing substantially all of said foam producing oils and a furfural phase substantially free of foaming oils.

8. The process of claim 7 including the further steps of fractionally distilling a hydrocarbon fraction and a fraction containing the foam producing oils, recycling the withdrawn hydrocarbon fraction and fractionally distilling the furfural phase to free it from the small amounts of hydrocarbon dissolved therein.

9. The process of claim 7 in which said contacting is effected by liquid-liquid extraction with a paraffin hydrocarbon.

10. The process of claim 7 in which said contacting is effected by liquid-liquid extraction with a pentane.

GEORGE THODOS.

REFERENCES CITED

The following references are of record in the file of this patent:

UNITED STATES PATENTS

| Number | Name | Date |
|---|---|---|
| 1,550,523 | Eichwald | Aug. 18, 1925 |
| 2,017,432 | Bahlke | Oct. 15, 1935 |
| 2,081,719 | Van Dyck | May 25, 1937 |
| 2,275,151 | Kimberlin | Mar. 3, 1942 |

OTHER REFERENCES

"Qualitative Organic Analysis," by Kamm, 2nd edition; published by J. Wiley & Sons, 1932. Pages 9 and 10.